(12) United States Patent
Clarkson et al.

(10) Patent No.: US 8,329,765 B2
(45) Date of Patent: Dec. 11, 2012

(54) FISCHER TROPSCH PROCESS

(75) Inventors: Jay Simon Clarkson, Crook (GB); Timothy Douglas Gamlin, Woking (GB); Lawrence Trevor Hardy, Stockton-on-Tree (GB)

(73) Assignees: BP Exploration Operating Company Limited, Middlesex (GB); Davy Process Technology Limited, London (GB)

( * ) Notice: Subject to any disclaimer, the term of this patent is extended or adjusted under 35 U.S.C. 154(b) by 700 days.

(21) Appl. No.: 12/083,007

(22) PCT Filed: Oct. 20, 2006

(86) PCT No.: PCT/GB2006/003900
§ 371 (c)(1),
(2), (4) Date: Aug. 12, 2009

(87) PCT Pub. No.: WO2007/049007
PCT Pub. Date: May 3, 2007

(65) Prior Publication Data
US 2009/0298958 A1    Dec. 3, 2009

(30) Foreign Application Priority Data
Oct. 25, 2005    (EP) .................................... 05256596

(51) Int. Cl.
*C07C 27/00*    (2006.01)
*B01J 20/34*    (2006.01)

(52) U.S. Cl. ........................ 518/715; 518/700; 502/54

(58) Field of Classification Search .................. 518/700, 518/715; 502/54
See application file for complete search history.

(56) References Cited

U.S. PATENT DOCUMENTS

| | | | |
|---|---|---|---|
| 4,675,343 A | 6/1987 | Courty et al. | |
| 5,728,918 A | 3/1998 | Nay et al. | |
| 5,811,365 A | 9/1998 | Barry | |
| 6,497,812 B1 | 12/2002 | Schinski | |
| 2009/0197981 A1 | 8/2009 | Rekker et al. | |

FOREIGN PATENT DOCUMENTS

| | | |
|---|---|---|
| CN | 101631611 A | 1/2010 |
| EP | 0 261 870 | 3/1988 |
| WO | 2004/026796 | 4/2004 |
| WO | WO 2007/130908 A2 | 11/2007 |

OTHER PUBLICATIONS

International Search Report for PCT/GB2006/003900 mailed Mar. 7, 2007.
Written Opinion for PCT/GB2006/003900 mailed Mar. 7, 2007.
International Preliminary Report for PCT/GB2006/003900 mailed Sep. 17, 2007.

*Primary Examiner* — Jafar Parsa
(74) *Attorney, Agent, or Firm* — Nixon & Vanderhye

(57) ABSTRACT

Process for converting synthesis gas to hydrocarbons in a slurry reactor in the presence of a Fischer-Tropsch catalyst comprising cobalt and zinc oxide. The process is carried out by a) activating the Fischer-Tropsch catalyst with a reducing gas consisting of hydrogen and an inert gas at a temperature between 330 and 400° C., and b) contacting the activated Fischer-Tropsch catalyst from step a) with synthesis gas in the slurry reactor in order to convert the synthesis gas into hydrocarbons.

17 Claims, No Drawings

FISCHER TROPSCH PROCESS

This application is the U.S. national phase of International Application No. PCT/GB2006/003900 filed 20 Oct. 2006 which designated the U.S. and claims priority to European Patent Application No. 05256596.7 filed 25 Oct. 2005, the entire contents of each of which are hereby incorporated by reference.

The present invention relates to a process for converting synthesis gas to hydrocarbons in the presence of a Fischer-Tropsch catalyst comprising cobalt and zinc oxide.

In particular, the present invention relates to a process for converting synthesis gas to hydrocarbons, in particular to hydrocarbons in the C5-C60 range particularly suitable for use as liquid motor fuels, in a slurry reactor in the presence of a Fischer-Tropsch catalyst comprising cobalt and zinc oxide.

It is well known that synthesis gas, i.e., hydrogen and carbon oxide(s), can be converted to hydrocarbons in the presence of a variety of transition metal catalysts. Thus, certain Group VIII metals, particularly iron, cobalt, ruthenium and nickel, are known to catalyse the conversion of carbon oxide(s) and hydrogen, also referred to as syngas or synthesis gas, to hydrocarbons. Such metal catalysts are commonly called Fischer-Tropsch catalysts. While the use of nickel preferentially produces methane upon conversion of syngas; the use of iron, cobalt and ruthenium tends to produce hydrocarbon mixtures consisting of hydrocarbons having a larger carbon number than methane. In the Fischer-Tropsch reaction synthesis gas is reacted in the presence of a heterogeneous catalyst to give a hydrocarbon mixture having a relatively broad molecular weight distribution. This product comprises predominantly straight chain saturated hydrocarbons which typically have a chain length of more than 5 carbon atoms. The reaction is highly exothermic and therefore heat removal is one of the primary constraints of all Fischer-Tropsch processes. Whilst most of Fischer-Tropsch reaction developments and knowledge have been made in the field of gas phase reactors, there is a clear tendency in the industry to concentrate now on slurry reactors which are more prone to solve the above heat removal constraints.

U.S. Pat. No. 5,728,918 discloses a process for the conversion of synthesis gas into hydrocarbons over a treated cobalt containing catalyst under Fischer Tropsch conditions characterized in that prior to performing said conversion the catalyst is contacted at a temperature between 200° C. and 350° C. with a gas containing carbon monoxide, substantially free of hydrogen, to produce said treated cobalt containing catalyst. All of the invention examples of U.S. Pat. No. 5,728,918 use a pure carbon monoxide catalyst reduction treatment in a fixed bed microreactor at a temperature of 250° C.; the said reduced catalyst is then used in the same fixed bed microreactor in order to convert syngas to hydrocarbons.

U.S. Pat. No. 5,811,365 claims a zinc oxide composition, which after calcination at 300° C. for 5 hours has a surface area of at least 30 m2/g, said composition comprising at least one trivalent or tetravalent metal other than one of Group VIII of the Periodic Table, said metal being in atomic percentage to the zinc of 0.9-6%, and in the form of metal and/or metal oxide and/or a compound thermally decomposable thereto, and/or a compound with said zinc oxide, and said zinc oxide composition being such that in the absence of said trivalent or tetravalent metal and after calcination at 300° C. for 5 hours it has a surface area of less than 30 m2/g. Invention example 6 of U.S. Pat. No. 5,811,365 uses a pure hydrogen catalyst reduction treatment in a fixed bed microreactor at a temperature of 300° C.; the said reduced catalyst is then used in the same fixed bed microreactor in order to convert syngas to hydrocarbons.

U.S. Pat. No. 4,675,343 discloses a process of use of a copper and cobalt-containing catalyst for synthesizing saturated primary aliphatic alcohols.

EP0261870 claims a composition for use after reductive activation as a catalyst in the conversion of synthesis gas to hydrocarbons, which composition comprises as essential components (i) cobalt either as the elemental metal, the oxide or a compound thermally decomposable to the elemental metal and/or oxide and (ii) zinc in the form of the oxide or a compound thermally decomposable to the oxide. The catalyst pre-treatment used in the examples of EP0261870 consists of a pure hydrogen treatment at temperatures of up to 320° C. in a fixed bed reactor; the said treated catalyst is then used in a fixed bed reactor in order to convert syngas to hydrocarbons.

In the development of their slurry reactor technology, the Applicants have unexpectedly found an improvement in their process for converting synthesis gas to hydrocarbons, said improvement relating to the stability of their specific cobalt zinc oxide catalyst in slurry reactor conditions.

Accordingly the present invention provides a process which comprises converting synthesis gas to hydrocarbons in a slurry reactor in the presence of a Fischer-Tropsch catalyst comprising cobalt and zinc oxide wherein the process comprises:
  a) activating the Fischer-Tropsch catalyst with a reducing gas consisting of hydrogen and inert gas at a temperature comprised between 330 and 400 degrees C., and
  b) contacting the activated Fischer-Tropsch catalyst from step a) with synthesis gas in the slurry reactor in order to convert the synthesis gas into hydrocarbons.

The prior art teaches away from using such high temperature activation treatment for cobalt FT catalyst. Quite surprisingly, the Applicants have found that the disadvantages found in the prior art were translated into unexpected advantages when the specific FT catalyst compositions of the present invention were submitted to activation process of the present invention and then contacted with synthesis gas in a slurry reactor. Said unexpected advantages can be found in the examples given hereafter.

Whilst not wishing to be bound by this theory, the Applicants believe that the cobalt metal crystallites attached to the zinc oxide support and resulting from this treatment are more resistant to oxidation by water produced in the Fischer-Tropsch reaction. The catalyst is thus able to maintain its activity over a substantially longer period of time.

The improved Fischer-Tropsch catalyst comprising cobalt and zinc oxide according to the present invention are especially useful for the conversion in a slurry reactor of synthesis gas to hydrocarbons, in particular to hydrocarbons in the C5-C60 range particularly suitable for use as liquid motor fuels. The converted hydrocarbon product stream generated has a broad molecular weight distribution comprising predominantly straight chain, saturated hydrocarbons which typically have a chain length of between 1 to 30 carbon atoms.

The particulate Fischer-Tropsch catalyst which is contacted with a reducing gas in step (a) is a catalyst comprising a cobalt oxide precursor and zinc oxide.

The said catalyst is contacted with the reducing gas at a temperature of 330 to 400 degrees C., more preferably at a temperature comprised between 351° C. and 400° C. Preferably the catalyst is contacted with the reducing gas at a pressure of 1-100 bar, and especially at a pressure of 1-10 bar.

The reducing gas used in the present invention consists of hydrogen and nitrogen.

According to a preferred embodiment of the present invention, the reducing gas consists of hydrogen and nitrogen in a molar ratio of 1 to 75% of hydrogen and 99 to 25% of inert gas, more preferably in a molar ratio of 20 to 30% of hydrogen and 80 to 70% of inert gas, said inert gas being preferably nitrogen.

The Applicants have unexpectedly found that the combination of the above reducing gas composition together with the high temperature activation range provides a catalyst which is highly active in the Fischer-Tropsch reaction, which has an improved selectivity towards liquid hydrocarbon products, and which also shows an overall improved stability.

Using pure hydrogen and/or lower temperatures for the activation step systematically led to a catalyst with an increased poor performance when used in FT slurry operations.

The Applicants have also unexpectedly found that the reducing gas should be substantially free of carbon monoxide. For the purpose of the present invention and appending claims, substantially free from carbon monoxide means that the volume ratio of carbon monoxide to hydrogen in the reducing gas must be lower than 5%. While not wishing to be bound by this theory, the Applicants believe that using a higher amount of carbon monoxide during the high temperature activation process according to the present invention would ultimately lead to a coking of the catalyst and thus would be detrimental towards the performance of the catalyst during the slurry conversion of syngas to hydrocarbons.

Generally prior to contacting the catalyst with the reducing gas the catalyst is treated with an inert gas selected from helium, argon or nitrogen, preferably nitrogen.

Usually the catalyst is also post treated with the inert gas prior to introducing the catalyst in the liquid medium of the slurry reactor.

While this is not a preferred embodiment of the present invention, the catalyst may also be activated by a sequential contact with carbon monoxide and then with the reducing gas according to the present invention. When a sequential contact is used, the contact with carbon monoxide must be operated at a temperature comprised between 220 and 280 C, preferably below 270° C. Advantageously, the catalyst is contacted with carbon monoxide followed by an inert gas and finally the reducing gas according to the present invention.

Contacting the FT catalyst comprising a cobalt oxide precursor and zinc oxide with the reducing gas as herein described above provides a catalyst which is highly active in the Fischer-Tropsch reaction, which has an improved selectivity to liquid hydrocarbon products, and which also shows an improved stability.

Generally, the catalyst may be contacted with the reducing gas in a fixed or fluidized bed reactor or a slurry reactor. According to a preferred embodiment of the present invention, the reducing gas activation step of the catalyst is performed in a fluidised bed reactor.

According to the present invention, the conversion of the syngas into hydrocarbons is performed in a slurry phase reactor. The slurry reactor used for the conversion of synthesis gas to hydrocarbons may be a tank reactor or a tubular loop reactor.

Preferably the Fischer-Tropsch synthesis reaction is operated with a gas hourly space velocity (GHSV) in the range of 100 to 40000 h−1, more preferably 1000 to 30000 h−1, most preferably 2000 to 15000, for example 4000 to 10000 h−1 at normal temperature and pressure (NTP) based on the feed volume of synthesis gas at NTP.

The Fischer-Tropsch process of the invention is preferably carried out at a temperature of 180-280° C., more preferably 190-240° C.

The Fischer-Tropsch process of the invention is preferably carried out at a pressure of 5-50 bar, more preferably 15-35 bar, generally 20-30 bar.

The synthesis gas may be prepared using any of the processes known in the art including partial oxidation of hydrocarbons, steam reforming, gas heated reforming, microchannel reforming (as described in, for example, U.S. Pat. No. 6,284,217 which is herein incorporated by reference), plasma reforming, autothermal reforming and any combination thereof. A discussion of these synthesis gas production technologies is provided in "Hydrocarbon Processing" V78, N. 4, 87-90, 92-93 (April 1999) and "Petrole et Techniques", N. 415, 86-93 (July-August 1998). It is also envisaged that the synthesis gas may be obtained by catalytic partial oxidation of hydrocarbons in a microstructured reactor as exemplified in "IMRET 3: Proceedings of the Third International Conference on Microreaction Technology", Editor W Ehrfeld, Springer Verlag, 1999, pages 187-196. Alternatively, the synthesis gas may be obtained by short contact time catalytic partial oxidation of hydrocarbonaceous feedstocks as described in EP 0303438. Preferably, the synthesis gas is obtained via a "Compact Reformer" process as described in "Hydrocarbon Engineering", 2000, 5, (5), 67-69; "Hydrocarbon Processing", 79/9, 34 (September 2000); "Today's Refinery", 15/8, 9 (August 2000); WO 99/02254; and WO 200023689. Preferably, a stream comprising a coolant liquid, e.g. a low boiling hydrocarbon(s) (for example, methanol, dimethyl ether, pentanes, hexanes or hexenes) may be introduced into the high shear mixing zone(s) and/or the reactor vessel (tank or tubular loop reactor) as described in WO 0138269 (PCT patent application number GB 0004444). Where the reactor vessel is a tank reactor the coolant liquid may also be introduced into the external conduit.

Preferably, the ratio of hydrogen to carbon monoxide in the synthesis gas is in the range of 20:1 to 0.1:1 by volume and especially in the range of 5:1 to 1:1 by volume e.g. 2:1 by volume.

Preferably, the hydrocarbons produced by contact of the synthesis gas with the Fischer-Tropsch catalyst comprise a mixture of hydrocarbons having a chain length of greater than 5 carbon atoms. Suitably, the hydrocarbons comprise a mixture of hydrocarbons having chain lengths of from 5 to about 90 carbon atoms. Preferably, a major amount, for example, greater than 60% by weight, of the hydrocarbons have chain lengths of from 5 to 30 carbon atoms.

The catalyst used in the present invention can be prepared according to any appropriate technique, e.g. by impregnation methods.

According to the present invention, the catalyst preferably comprises particles of a cobalt and zinc co-precipitate, having a volume average particle size of less than 150 μm and a particle size distribution wherein at least 90% of the volume of the catalyst particles have a size between 0.4 and 2.5 times the average particle size.

The volume average particle size and particle size distribution as used herein are as determined by a laser diffraction equipment, using a Malvern Master sizer MS 20 apparatus program contains 3 minutes, 25% (of maximum power) ultrasonic treatment before particle size distribution measurement; Calculation model: Model Independent; Presentation: 1907)

Catalysts according to the invention can inter alia be made by the co-precipitation of solutions containing Co- and Zn-precursors. The obtained co-precipitates (solids) can be post-treated and finally reduced to yield a Co on zinc oxide catalyst. Very suitable examples of co-precipitates include co-precipitates of Co/Zn oxide and Co/Zn carbonate, co-precipitates of Co/Zn hydroxide and Co/Zn hydroxycarbonate, and combinations thereof.

Preferably the volume average particle size of the catalyst is less than 100 μm, more preferably less than 50 μm. The lower limit is not particular critical. For practical purposes it is preferred that the size is at least such that the particles can still be separated from a liquid reaction mixture. Particularly suitable is for example a catalyst with an average particle size of 2 μm or more. Very good results have been achieved with a catalyst having a volume average particle size in the range of 5-50 μm.

With respect to the particle size distribution it is preferred that the amount of particles having a size of less than 0.4 times the average particle size is much lower (e.g. at least 5 times lower) than the amount of particles having a particle size of more than 2.5 times the average particle size. More preferably essentially none of the particles of the catalyst have a particle size of less than 0.4 times the average particle size.

Very good results have been obtained with a catalyst having a particle size distribution wherein at least 90% of the volume of the catalyst particles have a size between 0.5 and 2.2 times the average particle size, more preferably between 0.6 and 2 times the average particle size.

Preferably the pore volume of the catalyst—as determined by nitrogen adsorption (N2-BET), measured on an Ankersmit Quantachrome Autosorb-6 apparatus, after degassing the sample at 180 C to a pressure of 3.3 Pa (25 mTorr)—is at least mainly formed by pores having a diameter in the range of 5-100 nm. Much preferred wherein there are essentially no pores with a diameter of less than 5 nm (in particular less than 5% of the pore volume formed by pores with a diameter of less than 5 nm). It has been found that such a catalyst has particularly good diffusion properties for reactant and product. Such a catalyst has also been found to be highly selective towards the Fischer-Tropsch reaction. Very good results have been achieved with a catalyst having a pore volume of less than 0.5 ml/g. The pore volume is preferably at least 0.05 ml/g. Particularly suitable is a catalyst with an pore volume of less than 0.45 ml/g.

Also the surface area as determined by Ankersmit Quantachrome Autosorb-6 apparatus, after degassing at 180 C down to a pressure of 3.3 Pa (25 in Torr), can be chosen within the wide range, depending upon the intended purpose. For a Fischer-Tropsch process, this parameter may for example be chosen in the range of 1-120 m2/g. Preferably a catalyst has a surface area in the range of 5-100 m2/g Very good results have been achieved with a catalyst having a surface area in the range of 5-80 m2/g.

A preferred catalyst according to the invention is a particulate material wherein the particles have a more or less spherical geometry. Such a catalyst has been found to have very good strength and separation properties, and a relatively high attrition resistance during use.

Very suitable is a more or less spherically shaped catalyst wherein at least the majority of the particles have a multi-lobed spherical geometry. Particular good results, e.g. with respect to heat transfer and/or mass transfer properties, have been achieved with a catalyst wherein at least the majority of the particles are multi-lobed particles having a surface area that is at least 1.05 times, preferably at least 1.1 times, more preferably at least 1.2 times the surface area of the so called equivalent circle. The term "equivalent circle" is used herein to describe the largest circumference circle that can just fit within the outline of the particle, when the particle is projected (e.g. via a micrograph) onto a plane such that the orientation in view presents the maximum possible external surface area that can be seen in any view.

The composition of the catalyst can be varied widely, which composition the skilled professional will know to determine, depending upon the intended purpose. Preferably, the zinc to cobalt atomic ratio is in the range of 40 to 0.1, more preferably in the range of 20 to 0.3.

The catalyst preferably essentially consists of cobalt and zinc oxide. It is however also possible that the catalyst contains one or more other components, such as components that are commonly employed in Fischer-Tropsch catalysts. For example the catalyst may contain one or more promoters, such as ruthenium, hafnium, platinum, zirconium, palladium, rhenium, cerium, lanthanum or a combination thereof. When present, such promoters are typically used in a cobalt to promoter atomic ratio of up to 10:1.

It has been found that a catalyst according to the invention comprising at least one group IIIa element, preferably in a concentration of 0.1-10 wt % based upon the total weight of the catalyst, has a very favourable structural stability. Preferred group IIIa elements include aluminium (Al), gallium (Ga) and borium (B), of which aluminium is particularly preferred.

Very good results have been obtained with a catalyst according to the invention which is essentially. free of sodium. It has been found that a catalyst containing a relatively high amount of sodium is reduced in strength. Further, the presence of sodium has been found to poison the catalyst, reducing its Fischer-Tropsch activity. Therefore, a catalyst with a sodium content of less than 0.5 wt. %, more in particular of 0 to 0.15 wt. %, even more in particular of 0 to 0.1 wt. % based upon the weight of the catalyst, is preferred. Very good results have been achieved with a catalyst according to the invention having a low content of copper or being essentially free of copper. Copper may stimulate side reactions, such as the formation of an alcohol by hydrogenation of a ketone, an aldehyde or a carboxylic acid, which are usually preferably avoided or suppressed, especially in a Fischer-Tropsch process. The copper content is preferably less than 2 wt. %, more preferably 0 to 0.5 wt % even more preferably 0 to 0.2 wt. %, based upon the weight of the catalyst.

According to the present invention, it has been further advantageous to use a method for preparing the catalyst comprising cobalt and zinc oxide by co-precipitation of cobalt and zinc ions, wherein an acidic solution comprising zinc ions and cobalt ions and an alkaline solution are supplied to a reactor comprising an aqueous medium, preferably water or an aqueous solution, wherein the acidic solution and alkaline solution are contacted in the aqueous medium and a precipitate comprising cobalt and zinc is formed. The precipitate is thereafter separated from the aqueous medium (which may have formed a slurry together with the precipitate). The separated cobalt and zinc comprising precipitate is then dried and may be post-treated, e.g. calcined, etc., to form said catalyst.

The combination of. acidic solution and alkaline solution is preferably chosen such that the components of the acidic solution and of the alkaline solution are soluble in the aqueous medium, but that the cobalt and zinc precipitate when they are contacted with the alkaline solution, while the counter ions of zinc and cobalt substantially remain in solution. The skilled professional will know how to choose appropriate conditions, such as the type of counter ions and the concentrations for each of the components.

This method has been found to be particularly suitable for preparing a catalyst as described above.

It has been found that a method according to the invention allows the direct preparation of a particulate precipitate that acts as a free flowing catalyst precursor, directly after drying, i.e. it allows the preparation of a precipitate that does not have to be crushed or otherwise mechanically treated to form a particulate material.

Also a method according to the invention allows the preparation of particles with a more or less spherical, optionally multi-lobed, geometry.

Preferably the precipitation of particles is carried out at a substantially constant pH, in particular at a pH value varying at most plus or minus 0.2 pH units around a set-point value. Thus it has been found possible to make a catalyst precursor with very favorable free flowing characteristics.

Preferably, the alkaline solution and the acidic solution are supplied to the reactor simultaneously (from separate conduits).

Optionally the cobalt in the isolated and dried precipitate or calcined product is reduced to metallic cobalt Suitable sources for ionic zinc respectively ionic cobalt include salts thereof that are soluble in the acidic solution and in water in a sufficient concentration. Preferred examples of such salts include zinc nitrate respectively cobalt nitrate and zinc acetate respectively cobalt acetate and other inorganic or organic salts of cobalt respectively zinc that have a similar solubility in the acidic solution Suitable components for co-precipitating with the cobalt ions and zinc ions present are inorganic salts and organic salts that are soluble in an aqueous alkaline solution in a sufficient concentration, such as hydroxides, carbonates, urea, isocyanates and any other salt that can be used as base source and that can be dissolved water of in the alkaline solution. Preferred examples of such salts include ammonium carbonate, ammonium bicarbonate and other inorganic or organic salts of carbonate that have at least a similar solubility in the alkaline solution.

Preferably, the total concentration of zinc and cobalt ions in the aqueous medium is chosen in the range of 0.1 to 5 moles/liter. The concentration is preferably kept within this range throughout the precipitation step.

The pH of the acid solution is preferably in the range of 1-5. The pH of the alkaline solution is preferably in the range of 6-14. The pH in the aqueous medium (wherein the co-precipitation takes place) is preferably in the range of 4-9, depending upon the type of precursor salts used as a source for cobalt, zinc and alkaline component (s).

The stirring frequency is very suitably chosen to obtain a power input in the range of 1-300 kW/1 aqueous medium. Very good results have been achieved with a power input in the range of 10-100 kW/1 aqueous medium.

The temperature during the co-precipitation process is preferably chosen in the range of 5-98 C, more preferably in the range of 115-75 C.

The activation of the particulate Fischer-Tropsch catalysts according to the present invention will now be illustrated in the following examples;

EXAMPLE 1

Activation of Catalyst According to the Invention 10 ml (14.02 g) of a catalyst prepared according to the procedures detailed in WO03090925—except that a higher amount of Co(NO3)2.6H2O was used so that the obtained catalyst contains 20 wt % cobalt—, was charged to a glass reactor. Nitrogen gas at GHSV of 3500/h was supplied to the reactor to fluidise the catalyst and the reactor was heated to 130° C. at 10° C./h. The catalyst was held at 130° C. for 6 hours and was then allowed to cool back to room temperature still under nitrogen flow. The gas stream was then changed to a mixture of 25% hydrogen in nitrogen with the GHSV maintained at 3500/h. The catalyst was then heated to 200° C. at a rate of 14° C./h and held at this temperature for 10 h, before the temperature was raised to 360° C. at a rate of 7° C./h. The catalyst was held at 360° C. for 10 hours before being allowed to cool to room temperature.

EXAMPLE 2

Testing of Catalyst Activated According to the Invention

The sample of catalyst activated as in Example 1 was transferred to a slurry reactor (CSTR) containing 450 g of paraffin oil. After transfer, the autoclave was isolated from the activation reactor, the stirrer speed slowly increased to 750 rpm and then syngas (H2:CO ratio 2.0:1, GHSV=8000/h) was admitted into the autoclave and the system pressure increased to 20 barg. The temperature was increased to 185° C. at approximately 10° C./h before the increase was reduced to 2° C. every 4 h and the performance of the catalyst producing Fischer Tropsch products was monitored.

| Hours on stream (hr) | GHSV ($hr^{-1}$) | Temperature (° C.) | Conversion (mole %) | Selectivity to >C5 |
|---|---|---|---|---|
| 36 | 8000 | 199 | 29.2 | 84.6 |
| 60 | 8000 | 196 | 23.2 | 81.9 |
| 100 | 8000 | 197 | 21.9 | 80.9 |
| 212 | 8000 | 198 | 22.3 | 82.7 |
| 304 | 8000 | 198 | 21.5 | 81.9 |

EXAMPLE 3

Activation of Catalyst not According to the Invention 10 ml (13.08 g) of the same catalyst used in Example 1 was charged to a glass reactor. Nitrogen gas at GHSV of 3500/h was supplied to the reactor to fluidise the catalyst and the reactor was heated to 130° C. at 10° C./h. The catalyst was held at 130° C. for 6 hours and was then allowed to cool back to room temperature still under nitrogen flow. The gas stream was then changed to a mixture of 25% hydrogen in nitrogen with the GHSV maintained at 3500/h. The catalyst was then heated to 200° C. at a rate of 14° C./h and held at this temperature for 10 h, before the temperature was raised to 300° C. at a rate of 7° C./h. The catalyst was held at 300° C. for 10 hours before being allowed to cool to room temperature.

EXAMPLE 4

Testing of Catalyst Activated not According to the Invention

The sample of catalyst activated as in Example 3 was transferred to a CSTR containing 450 g of paraffin oil under nitrogen flow. Testing of the activated catalyst was again performed using the method described in Example 2.

| Hours on stream (hr) | GHSV (hr$^{-1}$) | Temperature (° C.) | Conversion (mole %) | Selectivity to >C5 |
| --- | --- | --- | --- | --- |
| 32 | 8000 | 206 | 43.5 | 90.4 |
| 56 | 8000 | 206 | 29.0 | 85.3 |
| 100 | 8000 | 206 | 17.8 | 79.5 |
| 200 | 8000 | 206 | 17.4 | 81.6 |
| 252 | 8000 | 206 | 16.0 | 81.4 |

A comparison between the two tables reflects that the catalyst activated according to the present invention is able to operate at a higher activity over the period after 100 hours on stream (higher conversion at lower temperature) and maintain this activity. This is very important since Fischer-Tropsch catalysts need time to "bed in" and it is the performance after 100 h that is most relevant to commercial operations.

The invention claimed is:

1. Process for converting synthesis gas to hydrocarbons in a slurry reactor in the presence of a Fischer-Tropsch catalyst comprising cobalt and zinc oxide, the process comprising:
   a) activating the Fischer-Tropsch catalyst with a reducing gas consisting of hydrogen and an inert gas at a temperature comprised between 330 and 400 degrees C., and
   b) contacting the activated Fischer-Tropsch catalyst from step a) with synthesis gas in the slurry reactor in order to convert the synthesis gas into hydrocarbons.

2. Process according to claim 1 wherein step a) is performed at a temperature comprised between 351 and 400 degrees C.

3. Process according to claim 1 wherein step a) is performed at a pressure comprised between 1 and 100 bar.

4. Process according to claim 1 wherein the reducing gas consists of hydrogen and an inert gas in a molar ratio of 1 to 75% of hydrogen and 99 to 25% of the inert gas.

5. Process according to claim 1 wherein the inert gas is nitrogen.

6. Process according to claim 1 wherein step a) is performed in a fluidised bed reactor.

7. Process for activating a Fischer-Tropsch catalyst comprising cobalt and zinc oxide for use for converting synthesis gas into hydrocarbons in a slurry reactor characterising in that the said catalyst is subjected to an activation step in the presence of a reducing gas consisting of hydrogen and an inert gas at a temperature comprised between 330 and 400 degrees C.

8. Process according to claim 7 wherein the activation step is performed at a pressure comprised between 1 and 100 bar.

9. Process according to claim 7 wherein the reducing gas consists of hydrogen and an inert gas in a molar ratio of 1 to 75% of hydrogen and 99 to 25% of the inert gas.

10. Process according to claim 7 wherein the inert gas is nitrogen.

11. Process according to claim 7 wherein step the activation step is performed in a fluidised bed reactor.

12. Activated Fischer-Tropsch catalyst for use for converting synthesis gas into hydrocarbons in a slurry reactor wherein a Fischer-Tropsch catalyst comprising cobalt and zinc oxide is activated according to the process of claim 7.

13. Process according to claim 3 wherein step a) is performed at a pressure comprised between 1 and 10 bar.

14. Process according to claim 4 wherein the reducing gas consists of hydrogen and an inert gas in a molar ratio of 20 to 30% of hydrogen and 80 to 70% of inert gas.

15. Process according to claim 7 wherein the temperature is comprised between 351 and 400 degrees C.

16. Process according to claim 8 wherein the activation step is performed at a pressure comprised between 1 and 10 bar.

17. Process according to claim 9 wherein the reducing gas consists of hydrogen and an inert gas in a molar ratio of 20 to 30% of hydrogen and 80 to 70% of inert gas.

* * * * *